United States Patent [19]

Latour et al.

[11] Patent Number: 4,849,102

[45] Date of Patent: Jul. 18, 1989

[54] BIDIRECTIONAL ULTRAFILTRATION APPARATUS

[75] Inventors: Guy Latour, Ecully, France; Richard Himmelsbach, Karlstein, Fed. Rep. of Germany; Denis R. Friedman, Acton, Mass.

[73] Assignee: Filtron Technology Corporation, Clinton, Mass.

[21] Appl. No.: 200,402

[22] Filed: May 31, 1988

[51] Int. Cl.⁴ .............................................. B01D 13/00
[52] U.S. Cl. ......................... 210/321.64; 210/321.75; 210/321.84
[58] Field of Search ........... 210/321.6, 321.64, 321.71, 210/321.75, 321.76, 321.84

[56] References Cited

U.S. PATENT DOCUMENTS

| | | | |
|---|---|---|---|
| 4,178,248 | 12/1979 | Porter et al. | 210/409 |
| 4,430,218 | 2/1984 | Perl et al. | 210/321.3 |
| 4,715,955 | 12/1987 | Friedman | 210/346 |
| 4,735,718 | 4/1988 | Peters | 210/321.75 |

*Primary Examiner*—Frank Sever
*Attorney, Agent, or Firm*—Heslin & Rothenberg

[57] ABSTRACT

A pair of membrane ultrafiltration cells are mounted one on each of the front and back surfaces of a central bidirectional manifold having an exit and an entrance conduit connector on the same side wall of the manifold. The manifold takes fluid to be filtered from a source through a conduit connector for full flow delivery to each filter cell and collects filtered fluid from each cell to be dispensed through a further connector. Plural manifolds may be connected to each other in a filter system for greatly increased filtering capacity.

10 Claims, 6 Drawing Sheets

BIDIRECTIONAL ULTRAFILTRATION APPARATUS

BIDIRECTIONAL ULTRAFILTRATION APPARATUS

This invention relates to a bidirectional ultrafiltration apparatus and more specifically to a plurality of large area filtration cells assembled on each side of a common central manifold which receives the initial feed flow and diverts it into oppositely positioned filter cells where, after the filtering process is complete, the filtrate is returned to the central manifold to be suitably dispensed therefrom.

BACKGROUND OF THE INVENTION

Ultrafiltration is a technique or procedure used to describe a process and apparatus utilized to separate dissolved molecules in solution based on the physical size of the molecules. Filtering apparatus, of the kind described, generally employ a thin membrane filter having transverse pores therethrough of predetermined precise opening size calculated to pass or hinder the passage of certain molecules therethrough. One well known ultrafiltration device utilizing an ultrafiltration membrane cell is disclosed and claimed in U.S. Pat. No. 4,715,955, which patent issued Dec. 19, 1987 to D. Friedman one of the inventors named in the present application, and is incorporated by reference in this application. Presently available membrane ultrafiltration cells commonly have effective membrane areas in the range of about 5.0 sq. ft. to about 50.0 sq. ft. Accordingly, a plurality of such Friedman devices are required when a larger scale filtering process is desired, and such a practice includes the complexity of an additional number of fluid flow lines and the need to make additional fluid conduit connections for the additional devices.

OBJECTS OF THE INVENTION

Accordingly, it is an object of this invention to provide a filtering system of increased capacity utilizing a plurality of interconnected filtering devices incorporating replaceable membrane filtering cells which are replaceable without the need of disconnecting any fluid conduit connections.

It is another object of this invention to provide a bidirectional manifold on which a plurality of replaceable membrane filtering cells are mounted.

It is yet another object of this invention to provide a filtering system having a central bidirectional distribution manifold which is connected to and between a pair of oppositely positioned membrane filtering cells to distribute a feed flow bidirectionally into the opposite cells and to collect filtrate flow from the cells for further disposition.

It is still another object of this invention to provide a filtering system utilizing a plurality of bidirectional manifold units to each of which a plurality of membrane filtering cells are expeditiously connected.

SUMMARY OF THE INVENTION

A large area high capacity membrane filtering system comprises the interconnection of a plurality of replaceable membrane filtering cells by the use of a bidirectional distributing manifold on which a pluality of filtering cells are directly mounted. The manifold receives the filter feed flow from a source and separates the feed stream into bidirectional branch streams for their flow into separate and opposite filtration cells from which the filtered fluid is returned to the manifold for further disposition.

This invention will be better understood from the following detailed description when considered in conjunction with the appended drawings.

DESCRIPTION OF PREFERRED EMBODIMENTS OF THE INVENTION

Figure 1:
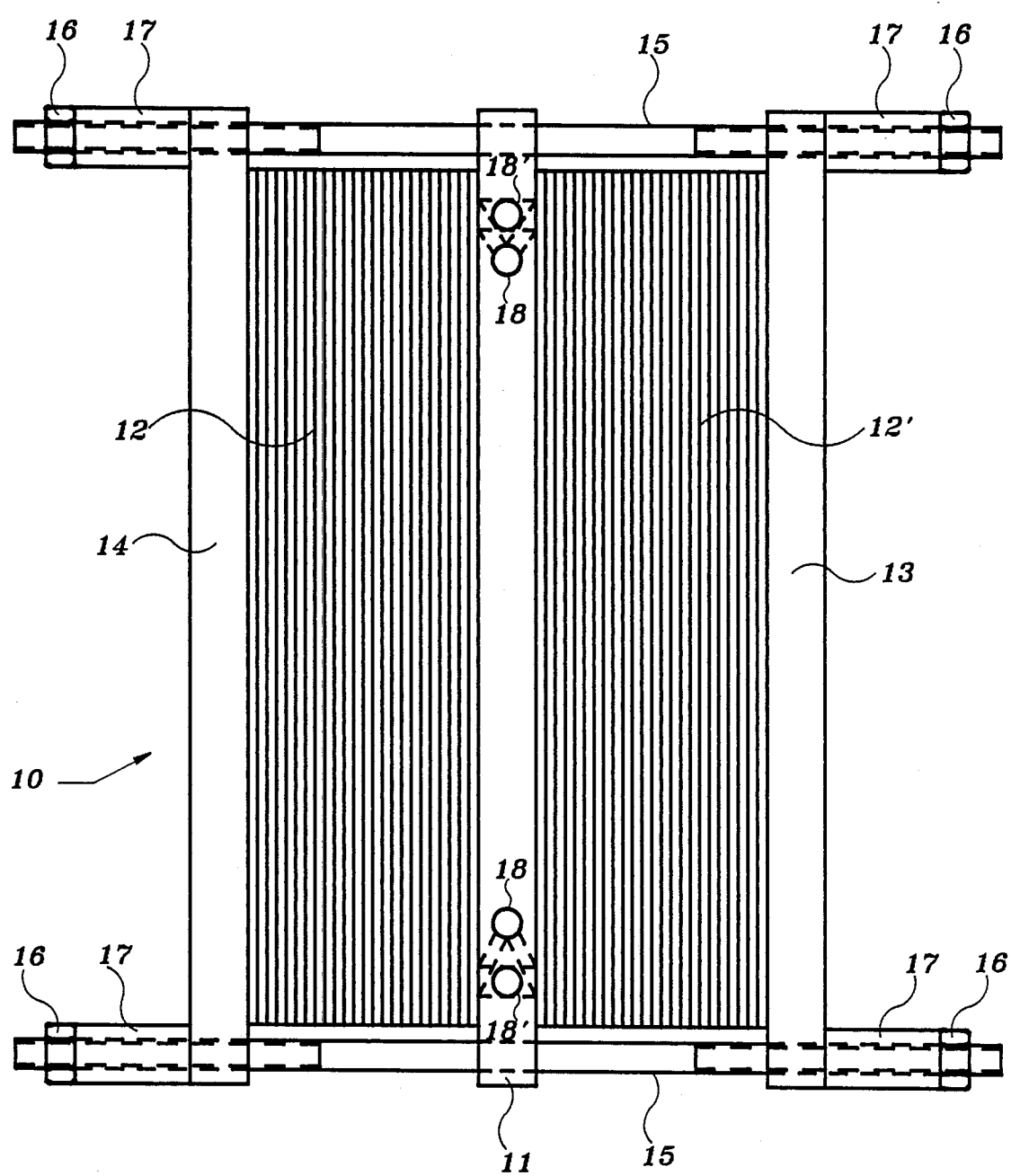
FIG. 1 is a schematic cross-sectional illustration of a central double manifold filtering structure of this invention.

Referring now to FIG. 1, a filtering structure 10, constructed in accordance with the principals of this invention, comprises a common bidirectional manifold 11 interconnecting a pair of ultrafiltration cells or modules 12 and 12' which are retained in structure 10 by end plates 13 and 14. Manifold 11 as well as end plates 13 and 14 are generally of a regular polygon configuration, for example rectangular, and are positioned in registry and edge parallel relationship in the assembly of the structure 10 as illustrated in FIG. 1. Four threaded rods 15 (only two shown) pass continuously through the array, each rod passing through plates 13 and 14 and manifold 11 adjacent a corner thereof. Threaded nut fasteners 16 and spacer collars 17 (FIG. 2) are utilized at opposite ends of rods 15 and serve to move plates 13 and 14 towards manifold 11 to press against filtering cells 12 and 12' which are positioned coaxially between plates 13 and 14 and manifold 11. Plates 13 and 14, and rods 15 and nut fasteners 16, constitute adjustable and releasably securing clamping means to retain cells 12 and 12' in the structure. Other positive clamping means such as those utilizing one or more threaded hand wheels or overcenter cam devices may be appropriately employed.

Figure 2:
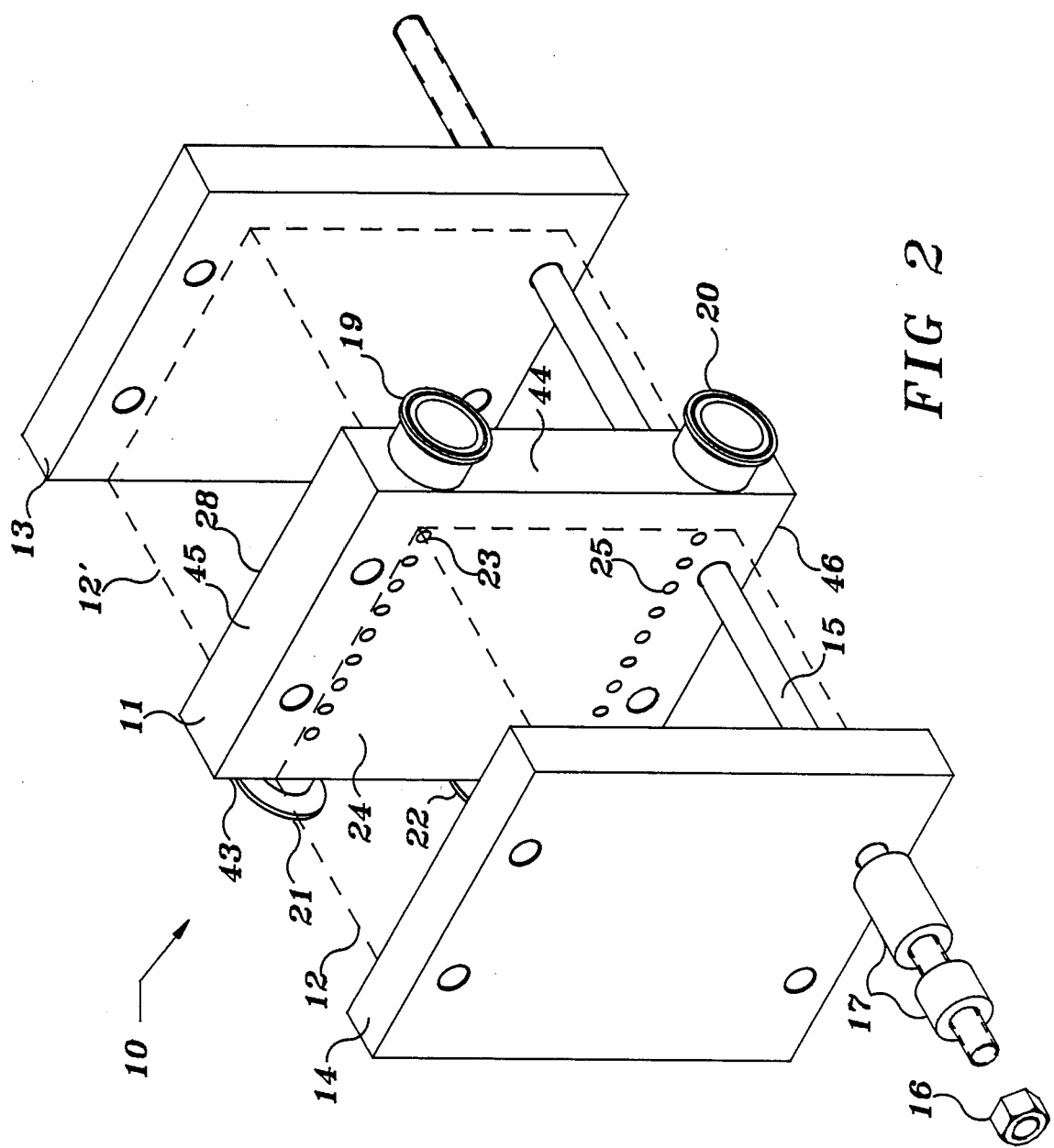
FIG. 2 is a schematic perspective and exploded illustration of a filtering system of this invention utilizing the structure of FIG. 1.

Manifold 11 simultaneously supplies fluid to be filtered to both cells 12 and 12' and receives fluid from both cells for further distribution. For this purpose, manifold 11 includes predetermined internal passages, and apertures or ports 18 and 18' leading to these passages. Such ports are fitted with conduit connectors to which fluid flow conduits are conveniently attached. Various conduit connectors may be suitably fitted to the ports of manifold 11. For example, such a connector may include a ¼" NPTF pipe connector or a flange type connector as shown in FIGS. 2-6. The basic structure 10 of FIG. 1 is included in FIG. 2 where the central double manifold 11 supports an opposed pair of membrane ultrafiltration cells 12 and 12' by the use of releasably receiving clamping means as described with respect to FIG. 1, i.e., plates 13 and 14, threaded rods 15, nut fasteners 16 and spacer collars 17 (FIG. 2). Manifold 11 also includes conduit connectors 19 and 20 on one sidewall and an opposite pair 21 and 22 on an opposite sidewall, for fluid entry and distribution purposes.

A first row of fluid flow apertures 23 are provided in one face 24 of manifold 11 between conduit connectors 19 and 21. Apertures 23 communicate, by means of appropriate internal passages in manifold 11, with one of the connectors such as 19. A second row of fluid flow apertures 25 between connectors 20 and 22 communicate with additional appropriate internal passages and other connectors. Apertures 23 are adapted to communicate with connector 19 to simultaneously direct fluid to be filtered into filtering cells 12 and 12', shown in phantom lines, and, through alternate apertures in the row, to collect filtered fluid from cells 12 and 12' into manifold 11 for further distribution from one or more of the other manifold connectors. Filter cell 12' is serviced by similar rows of apertures 26 and 27, respectively, (not shown) on the opposite or back surface 28 of manifold 11. Manifold connectors 19, 20, 21 and 22 are port openings which open into fluid passages in manifold 11 utilized to conduit fluid into and from both cells 12 and 12', and manifold 11. In one embodiment of this invention, manifold passages were arranged so that one connector served as the sole fluid inlet into manifold 11 while the remaining three connectors were exits.

Cells 12 and 12' embody the essential features of the membrane ultrafiltration cell of the noted U.S. Pat. No. 4,715,955—Friedman, as exemplified in FIGS. 1–7 therein. The present invention involves the use of a unique double manifold sandwiched between a pair of such ultrafiltration cells. One example of a structure of a double manifold of this invention utilized to service a pair of Friedman ultrafiltration membrane cells is illustrated in FIG. 3.

Figure 3:
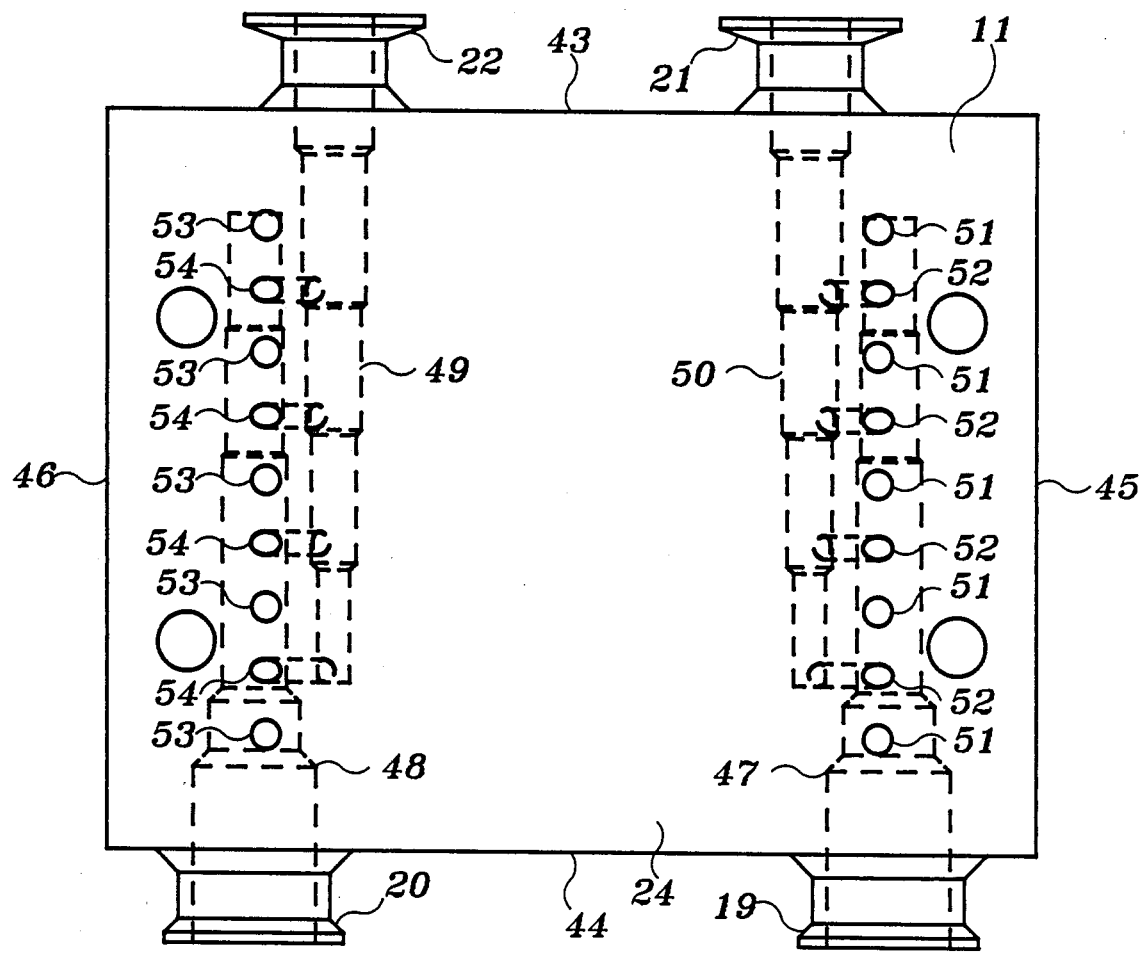
FIG. 3 is a top plan view of the central double manifold of this invention, with certain internal structure thereof shown in phantom.

Referring now to FIG. 3 which is a top plan view, manifold 11 comprises a generally rectangular plate of a non-corrosive material such as stainless steel. In one embodiment, manifold 11 comprises a stainless steel plate with dimensions of about 10.25 in. length×8.0 in. width×1.75 in. thick, and having a pair of opposed large area front and back surfaces 24 and 28 (FIG. 2), opposed narrow side walls 43 and 44, and opposed edge walls 45 and 46.

A pair of fluid conduit connectors 19 and 20 are provided in spaced relationship along one narrow side wall 44. A further pair of fluid conduit connectors 21 and 22 are positioned in spaced relationship along the opposite narrow sidewall 43. All opposed surfaces 24 and 28, 43 and 44, and 45 and 46 are conveniently parallel to each other. A first transverse closed end passage 47 passes through sidewall 44 to be adjacent edge wall 45. A second transverse closed end flow passage 48 passes through side wall 44 to be adjacent edge wall 46. Appropriate fluid flow conduit flange connectors 19 and 20 are fitted to passages 47 and 48, respectively, at the sidewall 44.

A pair of additional transverse closed end passages 49 and 50 pass perpendicularly through opposite side wall 43, each of which is positioned parallel to and closely adjacent passages 48 and 47, respectively, so that pairs of opposite passages 47 and 50 and 49 and 48 are adjacent opposite edge walls 45 and 46 of manifold 11, respectively. Appropriate conduit connectors 21 and 22 are fitted to passages 50 and 49, respectively at side wall 43.

Front surface 24 of manifold 11 is provided with a row of spaced apertures 51 along and adjacent edge wall 45. Apertures 51 pass through front surface 24 to intersect transverse passage 47 in fluid flow relationship. Interspersed with apertures 51 in the row are a plurality of alternate apertures 52. Apertures 52 pass through front surface 24 to intersect with transverse passage 50 in fluid flow relationship.

Figure 4:
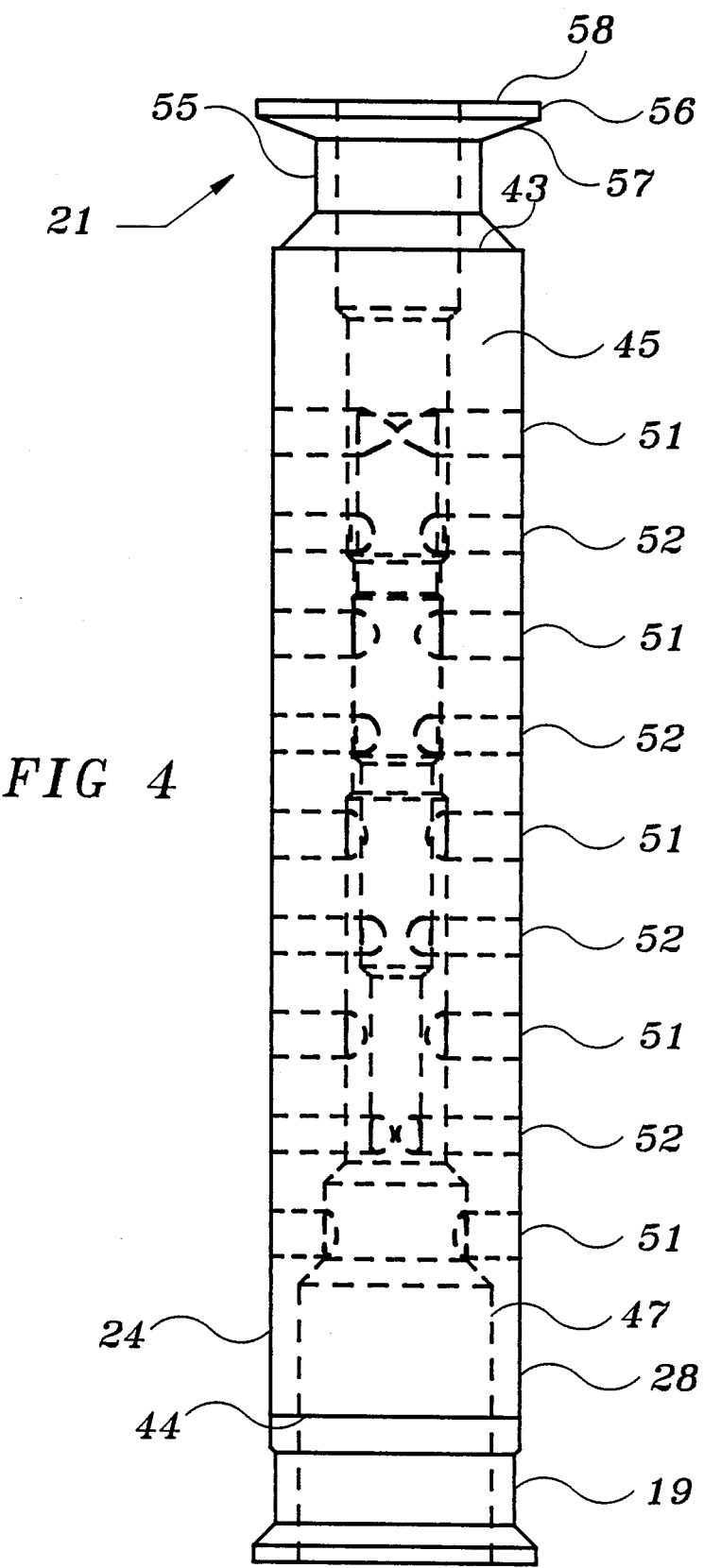
FIG. 4 is an end view of the manifold of FIG. 3 with certain internal structure thereof shown in phantom.

The row of apertures 51 and alternate apertures 52 are similarly repeated at the opposite edge wall 46 for transverse passages 48 and 49 as illustrated by aperture rows 23 and 25 of FIG. 2, and, in a substantially identical manner, the back surface 28 of manifold 11 includes like rows of apertures 51 and 53 and alternate apertures 52 and 54 adjacent opposite edge walls 45 and 46 which communicate with passages 47–50 in a like manner as described for front surface 24. FIG. 4 is an illustration of an end view of manifold 11 at edge wall 45 and shows the row of similar apertures 51 and 52. An end view at edge wall 46 would show the similar row of similar apertures 53 and 54 adjacent edge wall 46 and a flange connector 22 similar to the other connectors 19–21.

Flange connectors 19–22 are known in the art and generally comprise, as illustrated in FIG. 4, a sleeve-like projecting member 55 having a circumferential groove therein which defines an end flange 56 with a tapered sidewall 57 and a flat annular end face 58.

Figure 5:
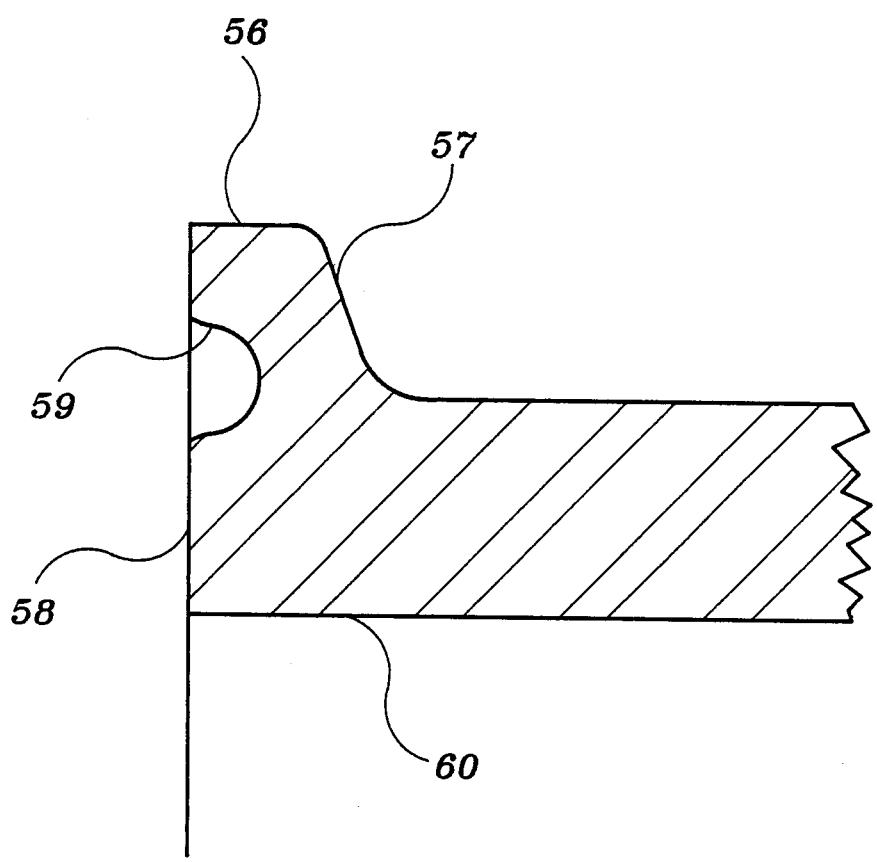
FIG. 5 is a partial and cross-sectional view of a flange connector.

FIG. 5 is a partial, cross-sectional view of one of the flange connectors 19–22. In FIG. 5 annular face 58 contains a concentric groove 59 in which an 0 ring gasket (not shown) is usually positioned to surround central passage 60. A conduit to be connected to a connector as described will also have the tapered wall 57 and flat face 58. The two faces abut each other to compress the 0 ring in groove 59. An adjustable circumferential clamp engages opposite tapered walls to retain the faces in engagement. In one form of this invention where four connectors 19–22 are employed, one pair on each of opposed side surfaces, appropriate passages in the manifold may support a single inlet or feed connector and multiple filtrate or exit connectors. Also, the described apertures of the various FIGS. such as 23, 25, 51, 52, 53, and 54 are adapted to communicate with predetermined passages 47–50 to provide conveniently located conduit connectors.

All noted apertures 51, 52, 53 and 54 and rows of apertures 23 and 25 (FIG. 2) are in alignment in their row and are coincident with cooperating apertures on rows of fluid flow passages in cells 12 and 12' to supply and accept fluid therefrom in the operation of the cells.

Briefly described, and in accordance with the principles set out in the noted Friedman patent, a cell 12 or 12' comprises, as an example, a vertically stacked array of thin rectangular membrane sections or sheets alternating with spacer sections of a polymeric material mesh screen. Each screen element and associated membranes define a narrow horizontal chamber with the membranes being common walls of adjacent chambers in the stacked array. Fluid to be filtered flows into these narrow chambers transversely through the screen. The fluid is caused to come into contact with a common membrane wall and passes through the wall into an adjacent chamber as filtered fluid. A row of fluid flow passages extend vertically along opposite edges of the stacked array of chambers. Adhesive cement seals off the edges of the chambers as well as the vertical passages from each other. Some of the vertical passages communicate with alternate chambers in the stacked array to supply fluid therein. Different ones of the vertical passages communicate with the noted adjacent chambers to accept filtered fluid therefrom. These conveniently noted vertical passages become coincident with the rows of apertures 23, 25, 52, 52, 53 and 54, and their counterparts in FIGS. 2, 3 and 4.

Figure 6:
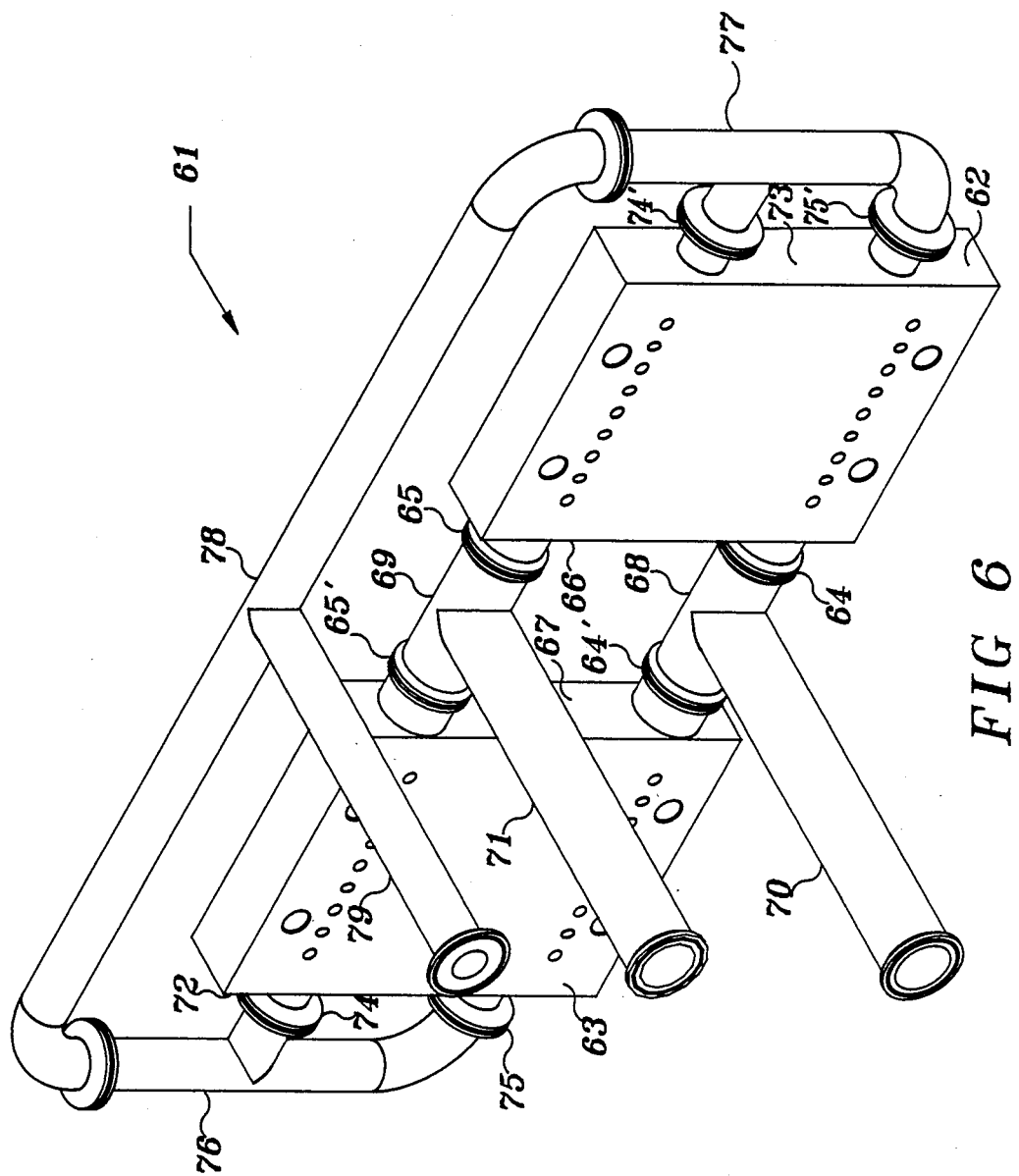
FIG. 6 is a frontal perspective view of a pair of manifolds of FIGS. 3 and 4 interconnected in a fluid filter system.

An ultrafiltration system of significantly increased capacity may be achieved by having conduit inlet and outlet connectors favorably located as described and connecting manifold 11 in multiples as illustrated in FIG. 6.

Referring now to FIG. 6, a filter system 61 comprises a pair of manifolds 62 and 63 similar in all respects to manifold 11 of FIG. 1 and 4. Each manifold 62 and 63 is provided with spaced apart feed and retentate connections 64 and 64', and 65 and 65' respectively along their sidewalls 66 and 67 which are in planar spaced apart juxtaposed relationship to each other so that their feed and retentate connections 64 and 64' and 65 and 65' are in coaxial alignment with each other. Interconnecting conduit means such as conduit T sections 68 and 69 are utilized to interconnect the feed connectors 64 and 64' and retentate connectors 65 and 65' respectively, and the conduit tangs 70 and 71 of the T sections provide a common fluid flow conduit for the feed and retentate connectors.

On opposite sidewalls 72 and 73 are pairs of filtrate connectors 74 and 75 and 74' and 75'. A pair of branch conduit connectors 76 and 77 interconnect connectors 74 and 75 and 74' and 75' of manifolds 62 and 63, and a loop conduit 78 connects to each branch connector 76 and 77. An intersecting connector 79 provides a connecting passage into loop conduit 78 as well as to both connectors 74, 74', 75 and 75' on manifold 62 and 63. With the arrangement as described for FIG. 6 each bidirectional central manifold 62 and 63 services opposed pairs of cells 12 and 12' as illustrated in the FIGS. 1 and 2 arrangement.

Assuming a membrane size of 50.0 sq. ft. for each membrane cell 12 or 12', the system 61 of FIG. 6 may utilize 200.0 sq. ft. of membrane area (4 cells) as compared to 50.0 sq. ft. for a device with a single manifold to service one cell, one example thereof being the subject of the noted Friedman patent, and 100.0 sq. ft. for the FIGS. 1 and 2 systems of the present invention. The foregoing advantages are accomplished with only one feed connection at T tang section 70 of FIG. 6 and, as described with respect to FIGS. 1 and 2, cells 12 or 12' may be replaced on a manifold without disconnecting a conduit connection. In certain circumstances, it may be desirable to employ more than two of the double manifold devices in a system.

In the systems disclosed and described, particularly those of FIGS. 1, 2, and 6, a preferred mode of operation includes positioning the manifolds in a substantially vertical orientation to service cells 12 and 12' in a horizontal manner as illustrated in these figures.

While this invention has been disclosed and described with respect to preferred embodiments it will be apparent to those skilled in the art that various modifications and changes may be made therein without departing from the scope of the invention as set forth in the appended claims.

What is claimed is:

1. A bidirectional, membrane, ultrafiltration system comprising means for enabling the system to utilize a substantially greater filtration area than that provided by a single manifold system, including:
   (a) a central bidirectional fluid flow manifold adapted to support a pair of opposite membrane filter cells thereon in fluid flow relationship,
   (b) said manifold having large planar area opposite front and back surfaces together with opposed narrow side walls and opposed narrow edge walls,
   (c) a pair of tangential flow membrane filtering cells positioned in opposed spaced apart relationship one on the front surface and one on the back surface of said manifold,
   (d) a pair of plate members positioned one on each side of, parallel with, and spaced from said manifold with each plate compressingly retaining a filtration cell against said manifold,
   (e) said manifold provided with fluid flow passages therein which interconnect with one of a pair of conduit connectors on one of said side walls to simultaneously supply each said filtration cell with a fluid to be filtered, and
   (f) said manifold provided with separate fluid flow passages interconnecting an outlet connector on an opposite one of said side walls to simultaneously collect filtered fluid from each of said cells.

2. The invention as recited in claim 1 wherein clamping means engage said plate members and said manifold to compressingly retain said cells between said manifold and said plates.

3. The invention of claim 1 wherein the front and back surfaces of said manifold are oriented in a substantially vertical direction.

4. The invention as recited in claim 1 wherein said manifold includes an additional conduit connector on each of said sidewalls to provide a spaced pair of conduit connectors on each sidewall, said manifold having passages therein connected to each conduit connector so that one of said pair of connectors on one sidewall is an inlet part connector for the said pair of filtering cells, and the remaining of said connectors are exit ports for said pair of filtering cells.

5. The invention as recited in claim 4 wherein a pair of said manifolds are positioned in spaced apart sidewall to sidewall juxtaposed relationship so that the inlet connector and exit connector on one sidewall are opposite their corresponding inlet and exit connectors on the opposing wall while spaced pairs of exit connectors are positioned on the sidewalls oppostie the juxtaposed sidewalls.

6. The invention as recited in claim 5 wherein interconnecting conduit means connect each said opposite inlet and exit connectors.

7. The invention as recited in claim 6 wherein a loop conduit interconnects said branch conduits on each said manifold.

8. The invention as recited in claim 7 wherein an exit conduit intersects said loop conduit to provide a common exit conduit for said pairs of exit connectors on the manifold sidewalls opposite to said juxtaposed sidewalls.

9. The invention as recited in claim 6 wherein a feeder conduit intersects said interconnecting conduit to provide a common inlet conduit for said opposed inlet connectors.

10. The invention as recited in claim 5 wherein branch conduits interconnect each said spaced pair of exit connectors on said sidewalls opposite said juxtaposed sidewalls.

* * * * *